(12) United States Patent
Shamsaasef et al.

(10) Patent No.: US 11,206,244 B2
(45) Date of Patent: Dec. 21, 2021

(54) METHOD TO PRESERVE VIDEO DATA OBFUSCATION FOR VIDEO FRAMES

(71) Applicant: ARRIS Enterprises LLC, Suwanee, GA (US)

(72) Inventors: Rafie Shamsaasef, San Diego, CA (US); Polly Tang, San Diego, CA (US); Kuang Ming Chen, San Diego, CA (US); William S. Watson, Mission Viejo, CA (US)

(73) Assignee: ARRIS Enterprise LLC, Suwanee, GA (US)

( * ) Notice: Subject to any disclaimer, the term of this patent is extended or adjusted under 35 U.S.C. 154(b) by 0 days.

(21) Appl. No.: 16/229,067

(22) Filed: Dec. 21, 2018

(65) Prior Publication Data

US 2020/0204525 A1 Jun. 25, 2020

(51) Int. Cl.
*H04L 29/06* (2006.01)
*H04L 9/06* (2006.01)
*G06F 11/07* (2006.01)
*H04N 7/10* (2006.01)
*H04N 21/4408* (2011.01)

(52) U.S. Cl.
CPC ........ *H04L 63/0428* (2013.01); *H04L 65/601* (2013.01); *H04L 65/607* (2013.01); *H04N 21/4408* (2013.01)

(58) Field of Classification Search
CPC . H04L 63/0428; H04L 65/601; H04L 65/607; H04N 21/4408
USPC ......................................................... 709/224
See application file for complete search history.

(56) References Cited

U.S. PATENT DOCUMENTS

| | | | | |
|---|---|---|---|---|
| 8,281,128 | B2 * | 10/2012 | Lee ...................... | H04N 21/242 713/160 |
| 8,782,305 | B2 * | 7/2014 | Tinsman ............... | H04L 65/607 710/52 |
| 10,110,613 | B2 * | 10/2018 | Swaminathan ....... | H04L 9/0822 |
| 10,187,684 | B2 * | 1/2019 | Barnett ............. | H04N 5/23293 |
| 10,652,301 | B2 * | 5/2020 | Botsford ............ | H04N 21/2402 |
| 2007/0136741 | A1 * | 6/2007 | Stattenfield .......... | G11B 27/105 725/32 |
| 2008/0235389 | A1 * | 9/2008 | Lindblom ............. | G10L 19/167 709/231 |

(Continued)

*Primary Examiner* — Kevin T Bates
*Assistant Examiner* — Golam Mahmud
(74) *Attorney, Agent, or Firm* — Chernoff Vilhauer LLP (57) ABSTRACT

A method and video decoder system using the method are provided for identifying video frames in an encoded or encrypted video stream without performing decoding or decryption. The method includes: receiving a video data stream comprised of a plurality of transport stream (TS) packets; detecting a first video frame in the video data stream, wherein detection of the first video frame includes registering a last checked position at the start of the video data stream, examining bytes in a next TS packet to identify a predetermined pattern indicating a network abstraction layer (NAL) unit, repeating the examining step until two TS packets have been identified that include an NAL unit, wherein the last checked position is updated after each examining step, and identifying a video frame based on a position of the NAL unit identified in the two TS packets; and repeating the detecting step for a plurality of additional video frames in the video data stream.

17 Claims, 5 Drawing Sheets

(56) References Cited

U.S. PATENT DOCUMENTS

| | | | |
|---|---|---|---|
| 2008/0291999 A1* | 11/2008 | Lerouge | H04N 21/8455 375/240.14 |
| 2009/0144596 A1* | 6/2009 | Mohan | H04N 19/895 714/746 |
| 2010/0211859 A1* | 8/2010 | Garcia | H04L 1/24 714/807 |
| 2010/0262628 A1* | 10/2010 | Singer | H04N 21/85406 707/803 |
| 2010/0299517 A1* | 11/2010 | Jukic | H04L 12/2809 713/150 |
| 2010/0306813 A1* | 12/2010 | Perry | A63F 13/77 725/114 |
| 2011/0276157 A1* | 11/2011 | Wang | H04N 21/8549 700/94 |
| 2012/0140769 A1* | 6/2012 | Hwang | H04L 69/22 370/389 |
| 2014/0334557 A1* | 11/2014 | Schierl | H04N 19/169 375/240.27 |
| 2015/0250001 A1* | 9/2015 | Tan | H04N 21/23106 370/329 |
| 2016/0044346 A1* | 2/2016 | Braness | H04N 21/2353 380/210 |
| 2016/0142746 A1* | 5/2016 | Schuberth | H04N 21/2146 725/31 |
| 2016/0255054 A1* | 9/2016 | Wan | H04L 63/0414 713/160 |
| 2016/0366107 A1 | 12/2016 | Tang et al. | |
| 2017/0078703 A1* | 3/2017 | Ridge | G06T 9/20 |
| 2017/0279865 A1* | 9/2017 | Iguchi | H04L 65/4076 |
| 2018/0060612 A1* | 3/2018 | Gladwin | H04L 63/0428 |
| 2018/0189461 A1* | 7/2018 | Ghafourifar | H04N 21/2347 |
| 2018/0241760 A1* | 8/2018 | Stephens | H04L 63/0281 |
| 2018/0255029 A1* | 9/2018 | Kim | H04N 21/64715 |
| 2018/0336209 A1* | 11/2018 | Burshteyn | H04L 9/0631 |
| 2019/0007756 A1* | 1/2019 | Navali | H04L 65/608 |
| 2019/0068895 A1* | 2/2019 | Hutz | H04N 5/2621 |
| 2020/0213839 A1* | 7/2020 | Truchan | H04W 12/033 |

\* cited by examiner

METHOD TO PRESERVE VIDEO DATA OBFUSCATION FOR VIDEO FRAMES

FIELD

The present disclosure relates to the identification and processing of video frames in an encoded or encrypted video stream, specifically the identification of video frames in a video stream that is obfuscated without requiring full decoding or decryption of any of the video data to identify the video frames.

BACKGROUND

In recent years, the streaming and digital delivery of video data has become a massive industry that is utilized across billions of computing devices every day. In many cases, video data that is being delivered to computing devices is obfuscated, encoded, encrypted, or otherwise transmitted in a manner where the underlying video cannot be read and displayed without performing some additional function (e.g., decrypted or decoding of the video data). Such techniques are often used to, among other advantages, reduce the bandwidth required to transmit the video data and to ensure that only an authorized recipient can view the video data.

When a computing device receives streamed video data, a media player on the device is often required to decrypted, decode, deobfuscate, or otherwise perform necessary actions on the video data before any of the video data may be read or other data gleaned from the data. In these cases, it may decrease the efficiency of the system and/or increase the processing speed and time required by the computing device to perform the functions required to deobfuscate the video data and play the video as new data is being received.

It may be beneficial for a secure media player on a computing device to be able to identify biographical data of received video data, such as the location of each of the video frames in the data. However, when the video data if obfuscated, having to deobfuscate the data prior to identifying the biographical data may negate the advantages of having access to such data. For instance, identifying the video frames ahead of deobfuscation may result in more efficient deobfuscation and playing of the video data. However, existing computing devices and media players lack the ability to identify video frames in obfuscated video data. Thus, there is a need for such capabilities in a computing system, where enough data can be extracted and deobfuscated from the video stream without compromising or exposing entire video frames in the video data.

SUMMARY

The present disclosure provides a description of systems and methods for identifying video frames in an encoded or encrypted video stream without performing full decoding or decryption. Streamed video data that is obfuscated in some manner is transmitted through a series of transport stream (TS) packets. The TS packets can be of varying sizes where a single video frame may be included in a number of TS packets, but where the number of TS packets for any given frame may be different due to the varying sizes of the TS packets. As such, the start and end of a video frame may be indicated by a network abstraction layer (NAL) unit in one of the TS packets. In order to identify such units when video data is obfuscated, bytes of each TS packet are analyzed to identify a predetermined pattern that matches an NAL unit, where the position (e.g., TS packet) that is being analyzed is kept track of throughout the process to ensure efficiency. The result is identification of NAL units, and from there video frames, without deobfuscation of the streamed video data.

A method for identifying video frames in an encoded or encrypted video stream without performing full decoding or decryption includes: receiving, by a receiver of a computing device, a video data stream, wherein the video data stream is comprised of a plurality of transport stream packets; detecting, by the computing device, a first video frame in the video data stream, wherein detection of the first video frame includes registering, by the computing device, a last checked position at the start of the video data stream, examining, by the computing device, bytes in a next transport stream packet of the plurality of transport stream packets to identify a predetermined pattern indicating a network abstraction layer (NAL) unit, repeating, by the computing device, the examining step until two transport stream packets have been identified that include an NAL unit, wherein the last checked position is updated after each examining step, and identifying, by the computing device, a video frame based on a position of the NAL unit identified in the two transport stream packets; and repeating, by the computing device, the detecting step for a plurality of additional video frames in the video data stream.

A system for identifying video frames in an encoded or encrypted video stream without performing full decoding or decryption, comprising: a receiver of a computing device configured to receive a video data stream, wherein the video data stream is comprised of a plurality of transport stream packets; and the computing device, wherein the computing device is configured to detect a first video frame in the video data stream, wherein detection of the first video frame includes registering, by the computing device, a last checked position at the start of the video data stream, examining, by the computing device, bytes in a next transport stream packet of the plurality of transport stream packets to identify a predetermined pattern indicating a network abstraction layer (NAL) unit, repeating, by the computing device, the examining step until two transport stream packets have been identified that include an NAL unit, wherein the last checked position is updated after each examining step, and identifying, by the computing device, a video frame based on a position of the NAL unit identified in the two transport stream packets; and repeat the detecting step for a plurality of additional video frames in the video data stream.

A non-transitory computer readable media has instructions operable to cause one or more processors to perform the operations including: receiving, by a receiver of a computing device, a video data stream, wherein the video data stream is comprised of a plurality of transport stream packets; detecting, by the computing device, a first video frame in the video data stream, wherein detection of the first video frame includes registering, by the computing device, a last checked position at the start of the video data stream, examining, by the computing device, bytes in a next transport stream packet of the plurality of transport stream packets to identify a predetermined pattern indicating a network abstraction layer (NAL) unit, repeating, by the computing device, the examining step until two transport stream packets have been identified that include an NAL unit, wherein the last checked position is updated after each examining step, and identifying, by the computing device, a video frame based on a position of the NAL unit identified in the two transport stream packets; and repeating, by the computing device, the detecting step for a plurality of additional video frames in the video data stream.

BRIEF DESCRIPTION OF THE DRAWINGS

The scope of the present disclosure is best understood from the following detailed description of exemplary embodiments when read in conjunction with the accompanying drawings. Included in the drawings are the following figures.

DETAILED DESCRIPTION

System for Identifying Video Frames in Obfuscated Video Data

Figure 1:
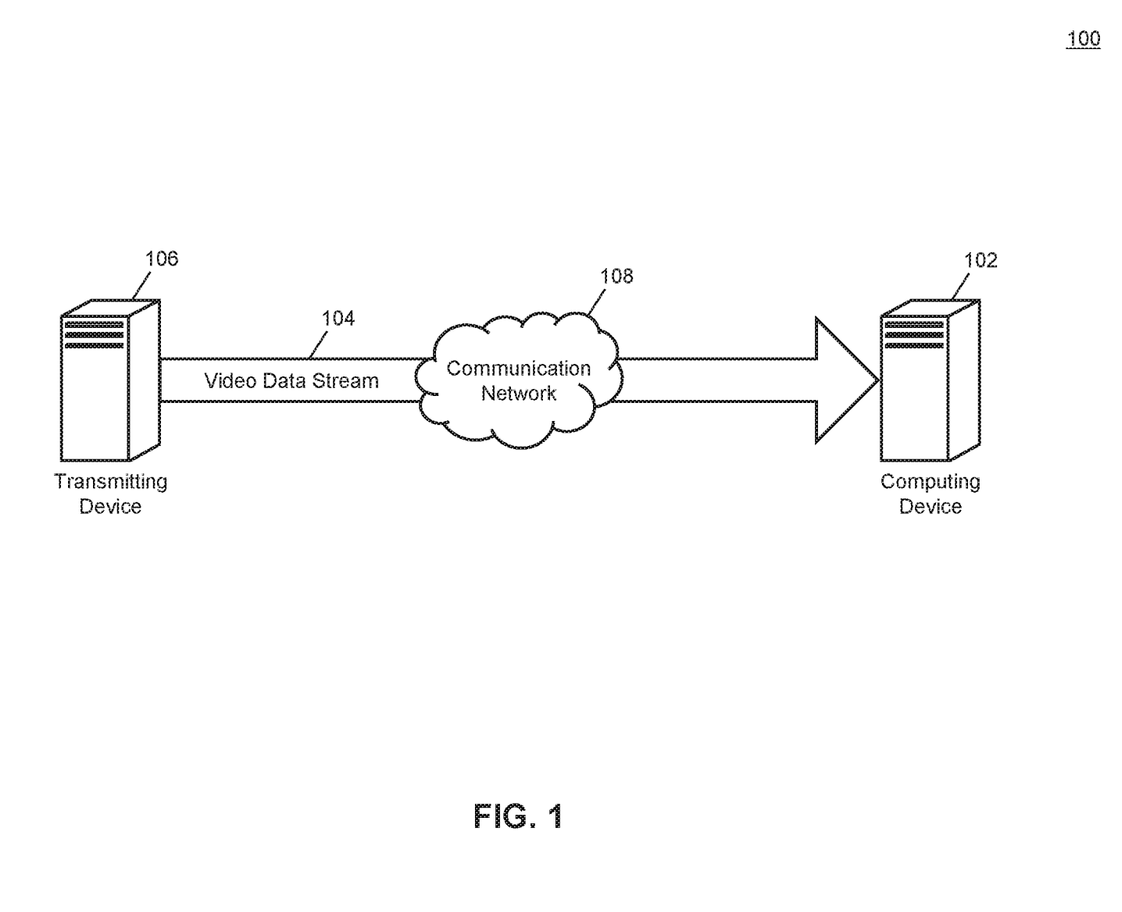
FIG. 1 is a block diagram illustrating a high level system architecture for identifying video frames in obfuscated video data in accordance with exemplary embodiments.

FIG. 1 illustrates a system 100 for identifying video frames in a video data stream where the video data has been obfuscated, where the frames may be identified without full deobfuscation of the video data.

The system 100 may include the computing device 102. The computing device 102, discussed in more detail below, may be configured to identify video frames in an obfuscated video data stream. The computing device 102 may be any type of computing device that has been specifically configured to perform the functions discussed herein, such as a specially configured cellular phone, smart phone, smart watch, wearable computing device, implantable computing device, smart television, desktop computer, laptop computer, notebook computer, tablet computer, etc. In some cases, the computing device 102 may operate as a specially configured application program (e.g., a web browsing program) or plug-in thereto executed by a computing system or other device. In the system 100, the computing device 102 may receive a video data stream 104. The video data stream 104 may be an electronic transmission of video data (e.g., in a single transmission or an ongoing transmission) that is received by the computing device 102. The data in the video data stream 104 may be obfuscated, such as through encoding, encryption, and/or any other technique or combination of techniques to render the video data unclear.

The video data stream 104 may be electronically transmitted to the computing device 102 by a transmitting device 106. The transmitting device 106 may be a web server, other computing device 102, cloud computing system, or any other type of system configured to electronically transmit video data streams 104 to computing devices 102 for receipt and playback. The video data stream 104 may be transmitted through one or more communication networks 108. Communication networks 108 may be any type of electronic network used to convey data between two computing systems, such as the Internet, a local area network, a wide area network, a cellular communication network, or a direct communication channel between two systems. The communication networks 108 may utilize any suitable method and protocol for enabling communications between the computing systems, such as radio frequency, Bluetooth, infrared, Wi-Fi, the Internet, etc.

The transmitting device 106 may electronically transmit the obfuscated video data stream 104 to the computing device 102 using the communication network 108. The computing device 102 may receive the obfuscated video data stream 104. The computing device 102 may have a media player stored therein for execution thereby, or may be in communication with another computing device or system that has such a player that can be used to display the clear content of the video data once it has been deobfuscated. Prior to deobfuscation of the video data stream 104, the computing device 102 may be configured to identify the video frames (e.g., positions, sizes, and/or other data thereof) located in the video data stream 104 without performing full deobfuscation of the video data stream 104.

The video data stream 104 may be comprised of a plurality of transport stream (TS) packets. Each TS packet may contain obfuscated video data, but may vary in size. In such instances, there may be no consistency or pattern in the size of the TS packets included in the video data stream 104. In some cases, the size of a TS packet may be set, such as based on a protocol or codec used (e.g., a Moving Pictures Experts Group TS packet may always be 188 bytes). In some embodiments, a TS packet may, in some cases, contain a packetized elementary system (PES) header. In these embodiments, the PES header may contain a bit used to indicate if the corresponding TS packet is aligned (e.g., contains alignment information) or unaligned (e.g., contains no alignment information). Such a bit, which may be referred to as a "data_alignment_indicator" bit may have a 0 or 1 value, where a 1 may indicate that the corresponding TS packet is aligned, and a 0 may indicate that the corresponding TS packet is unaligned.

In cases where the video data stream 104 may include TS packets that have PES headers that include alignment information, TS packets that are in the video stream 104 that have a PES header will contain a network abstraction layer (NAL) unit. A NAL unit operates as a separator between video frames in a video data stream 104. As such, the identification of two consecutive NAL units reveals a video frame in the video data stream 104 between the two NAL units. In the instances where TS packets have PES headers with a data_alignment_indicator bit having a value of 1, video frames can be easily identified by located TS packets with PES headers, where each such packet includes a NAL unit with video frames located between each consecutive NAL unit.

However, in cases where TS packets do not include PES headers or where all PES headers in the TS packets of a video data stream have a data_alignment_indicator bit having a value of 0, the computing device 102 cannot identify video streams strictly by looking for TS packets with a PES header. Instead, the computing device 102 may start at the first TS packet included in the video data stream 104 and look at the data included therein to identify a predetermined data pattern that is indicative of a NAL unit. In some cases, the predetermined pattern may be the same for all video data streams 104. In other cases, the predetermined pattern may be the same for any video data stream 104 that uses the same protocol for transmission and/or obfuscation. In some instances, the predetermined pattern may be different based on the obfuscation of a particular video data stream 104. In such instances, the computing device 102 may first identify the obfuscation technique used on the video data stream 104 (e.g., supplied by the transmitting device 106 or other suitable entity) to identify the predetermined pattern, or may be provided the predetermined pattern by the transmitting device 106 or other suitable entity. In an example, the predetermined pattern may be a byte consisting of 0x000001MM.

The computing device 102 may analyze each TS packet in order to locate the predetermined pattern. Once the first NAL unit is identified using the pattern, the computing device 102 may continue to analyze the TS packets until a second NAL unit is identified. The computing device 102 may then discern a video frame in the video data stream 104 based on the location of the two NAL units. The computing device 102 may then continue to analyze TS packets to locate more NAL units and subsequent video frames (e.g., where the next NAL unit may reveal a new video frame when combined with the second NAL unit of the first video frame). The computing device 102 may repeat the process for the video data stream 104 until all video frames have been identified therein.

In some cases, the computing device 102 may use a variable to track the position of the last TS packet that was searched for a NAL unit. In such cases, an integer or other data value may be stored in the computing device 102 that may indicate the location, TS packet number, or other value that indicates where in the video data stream 104 the computing device 102 last analyzed to attempt to identify a NAL unit. In these instances, the computing device 102 may be able to stop and restart the identification of video frames at will (e.g., in cases where transmission of the video data stream 104 may be interrupted) without having to reanalyze past TS packets to increase efficiency. In some instances, each time a video frame is found the position may be reset to a zero value. In these instances, the position variable may be used to thus identify the size of the video frame.

In some embodiments, the computing device 102 may be configured to extract video frames as they are identified. In such embodiments, the computing device 102 may extract an obfuscated video frame and provide the obfuscated video frame to a suitable application program or computing system for deobfuscation thereof. The obfuscated video frame may be provided to a demuxer (e.g., in the computing device 102 or other computing system), which may demux the video frame and thus identify clear content for playback to a user. In such embodiments, video frames may be deobfuscated and demuxed on an individual basis once received. Conversely, past methods are unable to discern video frames without full deobfuscation of the video data. As a result, the methods and systems discussed herein provide for greater efficiency and faster processing of streamed video data, as well as providing greater security as video frames may be identified by the computing device 102 without identifying underlying content.

Computing Device

Figure 2:
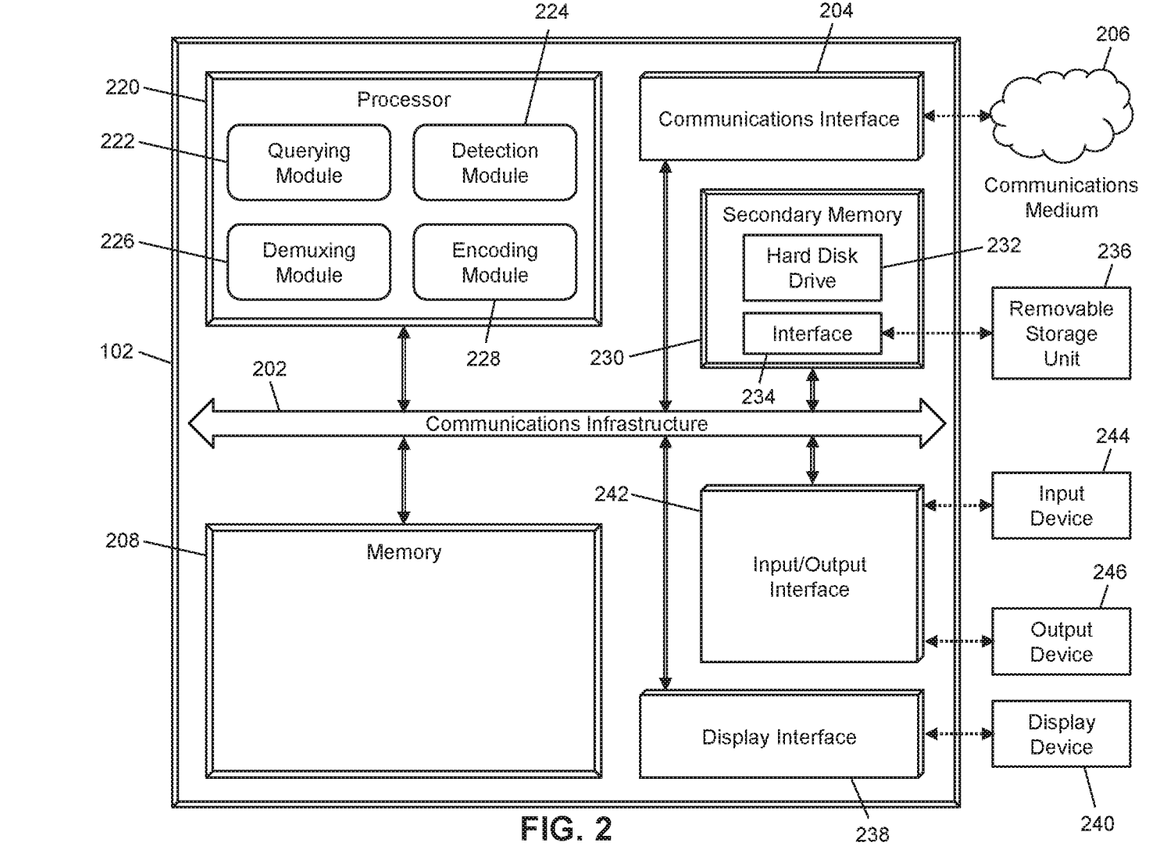
FIG. 2 is a block diagram illustrating the computing device of the system of FIG. 1 for identifying video frames in obfuscated video data in accordance with exemplary embodiments.

FIG. 2 illustrates an embodiment of the computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein.

The computing device 102 may include a communications infrastructure 202. The communications infrastructure 202 may be configured to transmit data between modules, engines, databases, memories, and other components of the computing device 102 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computing device 102 and external components of the computing device 102, such as externally connected databases, display devices, input devices, etc.

The computing device 102 may also include a communications interface 204. The communications interface 204 may include one or more interfaces used to interact with and facilitate communications between the computing device 102 and one or more external devices via suitable communications mediums 206 (e.g., the communication network 108). For instance, the communications interface 204 may interface with the communications infrastructure 202 and provide an interface 204 for connecting the computing device 102 to one or more communications mediums 204 for the electronic transmission or receipt of data signals (e.g., video data streams 104) that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, the Internet, radio frequency, Bluetooth, near field communication, etc.

In some instances, the computing device 102 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded thereon. For example, the communications interface 204 may include (e.g., or otherwise have access to, such as via the communications infrastructure 204) a parser program configured to receive and transform the received data signal into usable input for the functions performed by the processing device to carry out the methods and systems described herein.

The communications interface 204 may be configured to receive video data streams 104 electronically transmitted by transmitting devices 106 through one or more communications networks 108. Each video data stream 104 may be obfuscated using any suitable technique(s) and may be comprised of a plurality of TS packets that, as discussed herein, may be aligned or unaligned and may include or not include PES headers that contain such alignment information.

The computing device 102 may also include a memory 208. The memory 208 may be configured to store data for use by the computing device 102 in perform the functions discussed herein. The memory 208 may be comprised of one or more types of memory using one or more suitable types of memory storage, such as random access memory, read-only memory, hard disk drives, solid state drives, magnetic tape storage, etc. In some cases, the memory 208 may be non-transitory computer readable media, which may be configured to store data suitable for execution by the computing device 102 in performing the functions discussed herein. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computing device 102 may be configured to store, for instance, predetermined patterns of bytes that are indicative of a NAL unit, or data used to identify such predetermined patterns based on data obfuscation techniques used for a video data stream 104. The memory 208 may also be configured to store locations of NAL units identified in a video data stream and data regarding identified video frames. In cases where a positioning variable is used by the computing device 102, the positioning variable may be stored in the memory 208.

The computing device 102 may also include a processor 220. The processor 220 may be configured to perform the functions of the computing device 102 discussed herein as will be apparent to persons having skill in the relevant art. In some embodiments, the processor 220 may include and/or be comprised of a plurality of engines and/or modules specially configured to perform one or more functions of the processing device, such as a querying module 222, detection module 224, demuxing module 226, encoding module 228, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the computing device 102 may include a querying module 222. The querying module 222 may be configured to execute queries on databases to identify information. The querying module 222 may receive one or more data values or query strings, and may execute a query string based thereon on an indicated database, such as the memory 208, to identify information stored therein. The querying module 222 may then output the identified information to an appropriate engine or module of the computing device 102 as necessary. The querying module 222 may, for example, execute a query on the memory 208 to identify a predetermined pattern indicative of a NAL unit for the obfuscation method used to obfuscate the video data stream 104 for use in identifying video frames therein.

The processor 220 of the computing device 102 may also include a detection module 224. The detection module 224 may be configured to detect NAL units in TS packets included in a video data stream 104. In cases where TS packets include alignment data, NAL units may be detected via PES headers located in TS packets in the video data stream 104. In cases where TS packets are unaligned, the detection module 224 may detect NAL units by identifying a byte in a TS packet that matches a predetermined pattern indicative of a NAL unit. The detection module 224 may also be configured to detect video frames in the video data stream 104 based on identified NAL units.

In embodiments where the computing device 102 is configured to play back clear content from the video data stream 104, the computing device 102 may also include a demuxing module 226. The demuxing module 226 may be configured to demux deobfuscated video data for playback as clear content using a media player application program. The computing device 102 may also include en encoding module 228, which may be configured to decode an encoded video data stream 104 for deobfuscation thereof. The computing device 102 may alternatively or additionally include other modules for deobfuscation of video data streams 104 depending on the techniques used. For instance, an encryption/decryption module may be used in cases where the video data stream 104 if obfuscated using encryption.

In some embodiments, the computing device 102 may also include a secondary memory 230. The secondary memory 230 may be another memory in addition to the memory 208 that may be used to store additional data for use in performing the functions of the computing device 102 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computing device 102 may also include a display interface 238. The display interface may be configured to interface the computing device 102 with one or more display devices 240. The display devices 240 may be devices configure to display data received from the computing device 102. Display devices 240 may be any suitable type of display, including, for example, liquid crystal displays, light emitting diode displays, thin film transistor display, capacitive touch displays, etc. In some instances, the computing device 102 may include one or more display interfaces 238, which may interface with one or more display devices 240. Display devices 240 may, for example, display deobfuscated and demuxed video data from the video data stream 104.

The computing device 102 may also include an input/output interface 242. The input/output interface 242 may be configured to interface the computing device 102 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to a computing device 102, such as a keyboard, mouse, microphone, camera, touch screen, click wheel, scroll wheel, remote control, etc. Input devices 244 may be configured to receive input from a user of the computing device 102, such as for the selection of configuration options, supplying of authentication data, etc. Output devices 246 may include any suitable type of device for outputting data from a computing device 102, such as a speaker, remote control, headset, tactile feedback device, etc.

Video Data Streams

Figure 3A:
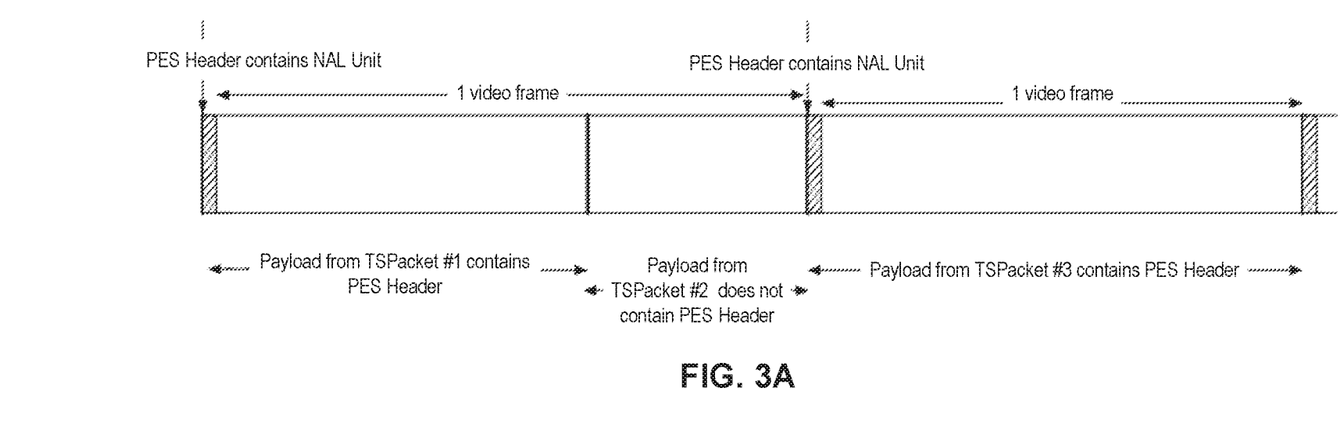
FIGS. 3A and 3B are diagrams illustrating received video data streams for the identification of video frames therein based on alignment information for received transport stream packets.
Figure 3B:
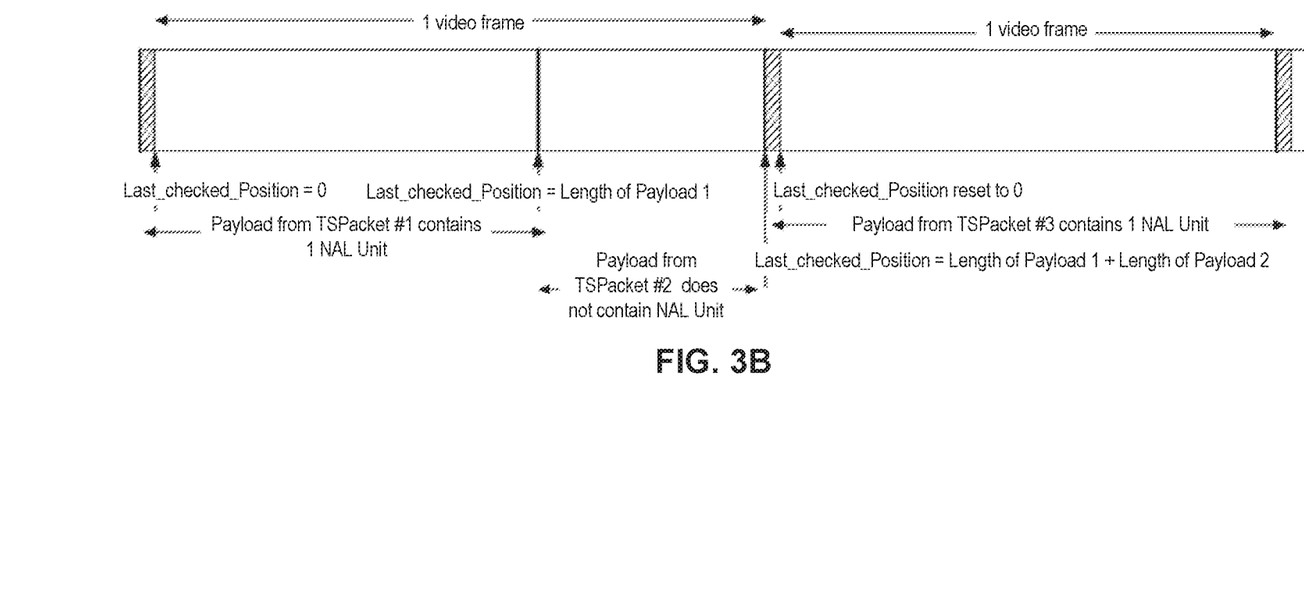

FIGS. 3A and 3B illustrates video data streams 104 received by the computing device 102 for identification of video frames included therein based on available alignment data.

FIG. 3A illustrates a video data stream 104 that is received by the computing device 102 where some TS packets include a PES header that has a data_alignment_indicator bit with a value of 1. In such a video data stream 104, the computing device 102 can identify the TS packets that include a PES header to identify the NAL units. As illustrated in FIG. 3A, TS Packets #1 and #3 contain PES headers, and thus contain NAL units, while TS Packet #2 does not contain a PES header. As such, the NAL units are located at the start of each of TS Packets #1 and #3. The computing device 102 can thus readily identify video frames in the video data stream 104 as occurring between the NAL units.

FIG. 3B illustrates a video data stream 104 where the TS packets do not include PES headers or where any PES headers have data_alignment_indicator bits with a value of 0. In such cases, the computing device 102 may search through each of the TS packets and may record the position of the search using a value, illustrated in FIG. 3B as Last_checked_position. As illustrated, the computing device 102 may identify a NAL unit for the start of a video frame in TS Packet #1, but may not identify any NAL unit in TS Packet #2, and may update the Last_checked_position accordingly as it finishes with each of the packets. After the NAL unit is identified in TS Packet #3, the Last_checked_position may be reset to 0 and the video frame that occurs between both NAL units identified accordingly.

Process for Identification of Video Frames in Obfuscated Video Data

Figure 4:
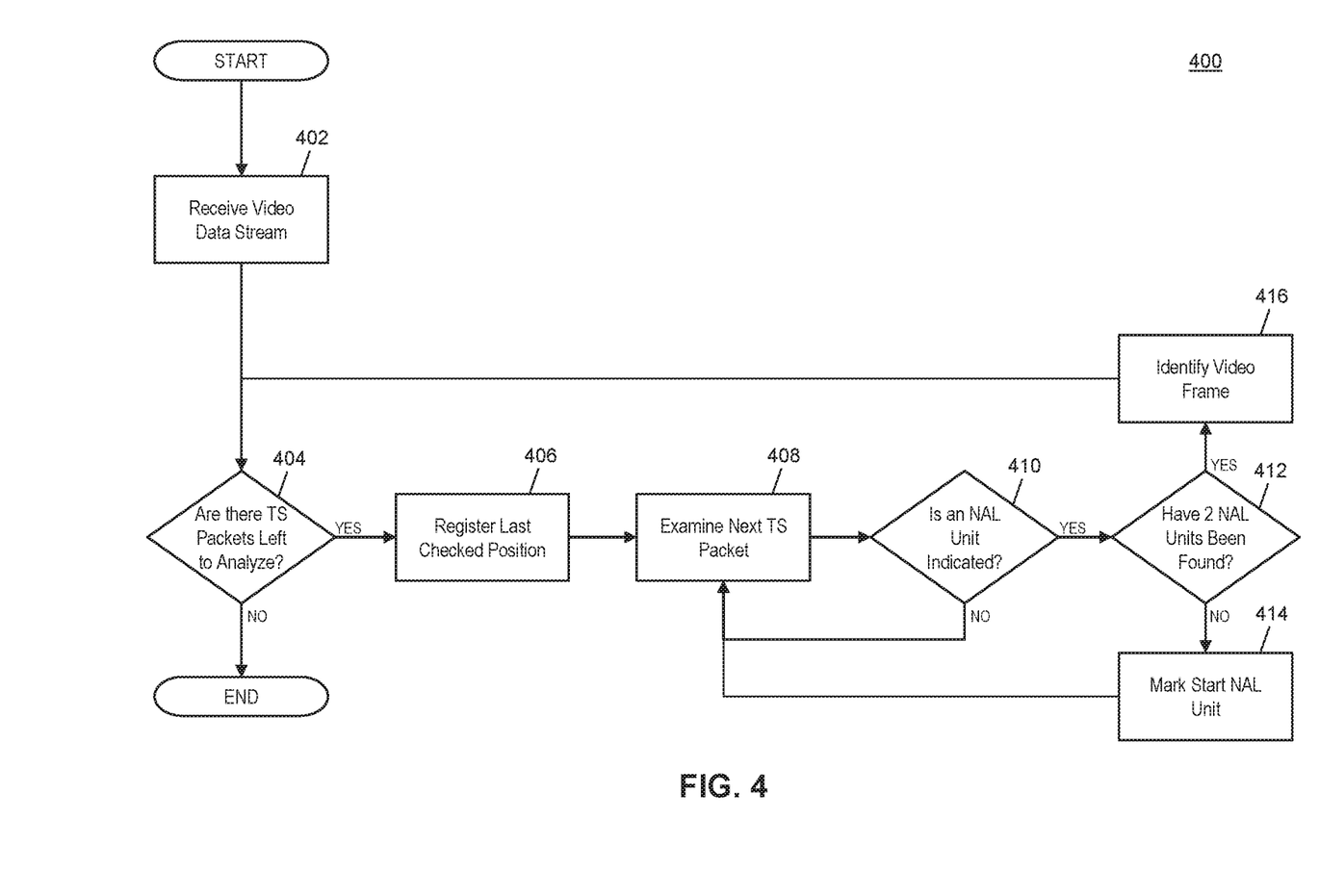
FIG. 4 is a flow diagram illustrating a process for identifying video frames in obfuscated video data using the computing device of FIG. 2 in accordance with exemplary embodiments.

FIG. 4 illustrates a process 400 for the identification of video frames in obfuscated video data executed by the computing device 102 in the system 100 without requiring full deobfuscation of the video data.

In step 402, the computing device 102 may receive a video data stream 104 from the transmitting device 106 through one or more communication networks 108. The video data stream 104 may be comprised of a plurality of TS packets. In the process 400 illustrated in FIG. 4 and discussed herein, the TS packets may not include PES headers or may include PES headers with a data_alignment_indicator bit having a value of 0. In step 404, the computing device 102 may determine if there are any TS packets in the video data stream 104 that still need to be analyzed for the identification of video frames.

If there are still TS packets left to analyze, then, in step 406, the computing device 102 may update the Last_checked_position value to the start of the next TS packet to be analyzed. In step 408, the next TS packet may be analyzed to identify if there is a byte included therein that matches a predetermined pattern indicative of a NAL unit. In step 410, the computing device 102 may determine if such a byte was found in the TS packet. If no byte was found, then the process 400 may return to step 408 where the next TS packet is analyzed. In some cases, the process 400 may return to step 406 to update the Last_checked_position prior to moving to the next TS packet. If an NAL unit was identified in the TS packet, then, in step 412, the computing device 102 determines if two consecutive NAL units have been found. In cases where a first video frame has already been identified, every subsequent NAL unit may be considered to be a second consecutive NAL unit as the end NAL unit for a video frame may also serve as the start NAL unit for the next video frame. If only a single NAL unit has been identified, then, in step 414, the computing device 102 may store a reference to the identified NAL unit as being a start NAL unit, and may return to step 408 (e.g., or step 406, as applicable) to examine the next TS packet.

If, in step 412, the computing device 102 determines that two consecutive NAL units have been found, then, in step 416, the computing device 102 may identify a video frame as being located between the two consecutive NAL units. In some embodiments, the video frame may be extracted and provided to an encoding module 228 or other system for deobfuscation thereof, which may then be provided to a demuxing module 226 for demuxing and later playback using a suitable media player. After the video frame is identified, the process 400 may return to step 404 to determine if there are any TS packets remaining to be analyzed. Once every TS packet has been analyzed, then the process 400 may be completed. In cases where the video data stream 104 is transmitted to the computing device 102 in an ongoing transmission, the process 400 may be completed by awaiting the receipt of new TS packets, which may be received in step 402 and the process 400 continue until the ongoing transmission ends.

Exemplary Method for Identification of Video Frames

Figure 5:
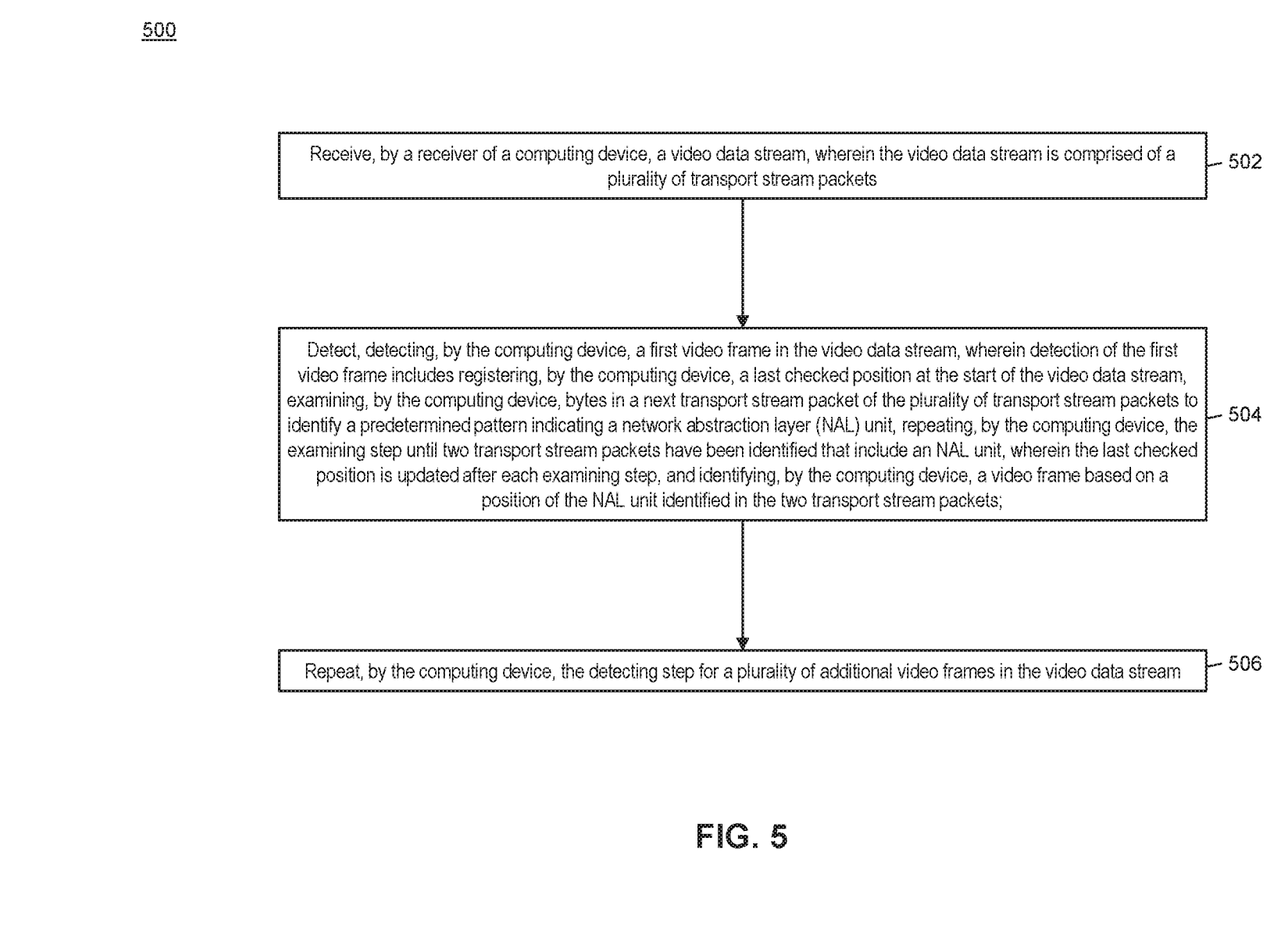
FIG. 5 is a flow chart illustrating an exemplary method for identifying video frames in an encoded or encrypted video stream in accordance with exemplary embodiments.

FIG. 5 illustrates a process 500 for the identification of video frames in an encoded or encrypted video stream without performing full decoding or decryption of the video stream.

In step 502, a video data stream (e.g., the video data stream 104) may be received by a receiver (e.g., the communications interface 104) of a computing device (e.g., the computing device 102), wherein the video data stream is comprised of a plurality of transport stream packets. In step 504, a first video frame may be detected in the video data stream by the computing device, wherein detection of the first video frame includes: registering, by the computing device, a last checked position at the start of the video data stream, examining, by the computing device, bytes in a next transport stream packet of the plurality of transport stream packets to identify a predetermined pattern indicating a network abstraction layer (NAL) unit, repeating, by the computing device, the examining step until two transport stream packets have been identified that include an NAL unit, wherein the last checked position is updated after each examining step, and identifying, by the computing device, a video frame based on a position of the NAL unit identified in the two transport stream packets. In step 506, the detecting step may be repeated by the computing device for a plurality of additional video frames in the video data stream.

In one embodiment, each transport stream packet may include a data alignment indicator bit indicating that the transport stream packet is unaligned. In some embodiments, the video data stream may be encoded or encrypted. In a further embodiment, the bytes in the next transport stream packet may be examined without full decoding or decrypting the video data stream. In one embodiment, detecting the first video frame may further include extracting, by the computing device, the identified video frame. In a further embodiment, extracting the identified video frame may include transmitting, by a transmitter (e.g., the communications interface 104) of the computing device, the identified video frame to a demuxer.

Techniques consistent with the present disclosure provide, among other features, systems and methods for identifying video frames in an encoded or encrypted video stream. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying video frames in an encoded or encrypted video stream without performing full decoding or decryption, comprising:
    receiving, by a receiver of a computing device, a video data stream, wherein the video data stream is comprised of a plurality of obfuscated transport stream packets;
    classifying, by the computing device, a plurality of sequential obfuscated transport stream packets as together comprising both boundaries of only a first identified video frame in the video data stream, without de-obfuscating any portion of the sequential obfuscated transport stream packets, and wherein classification of the first video frame includes
        registering, by the computing device, a last checked position at the start of the video data stream,
        examining, by the computing device, bytes in a next transport stream packet of the plurality of transport stream packets to identify a predetermined pattern indicating a network abstraction layer (NAL) unit,
        repeating, by the computing device, the examining step until two transport stream packets have been identified that each include an NAL unit, wherein the last checked position is updated after each examining step, and
        identifying, by the computing device, a video frame based on a position of the NAL units identified in the two transport stream packets; and
    repeating, by the computing device, the classification step for a plurality of additional video frames in the video data stream.

2. The method of claim 1, wherein each transport stream packet includes a data alignment indicator bit indicating that the transport stream packet is unaligned.

3. The method of claim 1, wherein the bytes in the next transport stream packet are examined without decoding or decrypting the video data stream.

4. The method of claim 1, wherein classifying the first video frame further includes extracting, by the computing device, the identified video frame.

5. The method of claim 4, wherein extracting the identified video frame includes transmitting, by a transmitter of the computing device, the identified video frame to a demuxer.

6. The method of claim 4, wherein extraction of the identified video frame is performed by a plug-in of a browser application program executed by the computing device.

7. A system for identifying video frames in an encoded or encrypted video stream without performing full decoding or decryption, comprising:
    a receiver of a computing device configured to receive a video data stream, wherein the video data stream is comprised of a plurality of obfuscated transport stream packets; and
    the computing device, wherein the computing device is configured to
        classify a plurality of sequential obfuscated transport stream packets as together comprising both boundaries of only a first identified video frame in the video data stream, without de-obfuscating any portion of the sequential obfuscated transport stream packets, and wherein classification of the first video frame includes
            registering, by the computing device, a last checked position at the start of the video data stream,
            examining, by the computing device, bytes in a next transport stream packet of the plurality of transport stream packets to identify a predetermined pattern indicating a network abstraction layer (NAL) unit,
            repeating, by the computing device, the examining step until two transport stream packets have been identified that each include an NAL unit, wherein the last checked position is updated after each examining step, and
            identifying, by the computing device, a video frame based on a position of the NAL units identified in the two transport stream packets; and
        repeat the classification step for a plurality of additional video frames in the video data stream.

8. The system of claim 7, wherein each transport stream packet includes a data alignment indicator bit indicating that the transport stream packet is unaligned.

9. The system of claim 7, wherein the bytes in the next transport stream packet are examined without decoding or decrypting the video data stream.

10. The system of claim 7, wherein classifying the first video frame further includes extracting, by the computing device, the identified video frame.

11. The system of claim 10, wherein extracting the identified video frame includes transmitting, by a transmitter of the computing device, the identified video frame to a demuxer.

12. The system of claim 10, wherein extraction of the identified video frame is performed by a plug-in of a browser application program executed by the computing device.

13. A non-transitory computer readable media having instructions operable to cause one or more processors to perform the operations comprising:
    receiving, by a receiver of a computing device, a video data stream, wherein the video data stream is comprised of a plurality of obfuscated transport stream packets;
    classifying, by the computing device, a plurality of sequential obfuscated transport stream packets as together comprising both boundaries of only a first identified video frame in the video data stream, without de-obfuscating any portion of the sequential obfuscated transport stream packets, and wherein detection of the first video frame includes
        registering, by the computing device, a last checked position at the start of the video data stream,
        examining, by the computing device, bytes in a next transport stream packet of the plurality of transport stream packets to identify a predetermined pattern indicating a network abstraction layer (NAL) unit, repeating, by the computing device, the examining step until two transport stream packets have been identified that each include an NAL unit, wherein the last checked position is updated after each examining step, and identifying, by the computing device, a video frame based on a position of the NAL units identified in the two transport stream packets; and repeating, by the computing device, the classification step for a plurality of additional video frames in the video data stream.

14. The non-transitory computer readable media of claim 13, wherein each transport stream packet includes a data alignment indicator bit indicating that the transport stream packet is unaligned.

15. The non-transitory computer readable media of claim 13, wherein the bytes in the next transport stream packet are examined without decoding or decrypting the video data stream.

16. The non-transitory computer readable media of claim 13, wherein classifying the first video frame further includes extracting, by the computing device, the identified video frame.

17. The non-transitory computer readable media of claim 16, wherein extracting the identified video frame includes transmitting, by a transmitter of the computing device, the identified video frame to a demuxer.

\* \* \* \* \*